Figure 1:
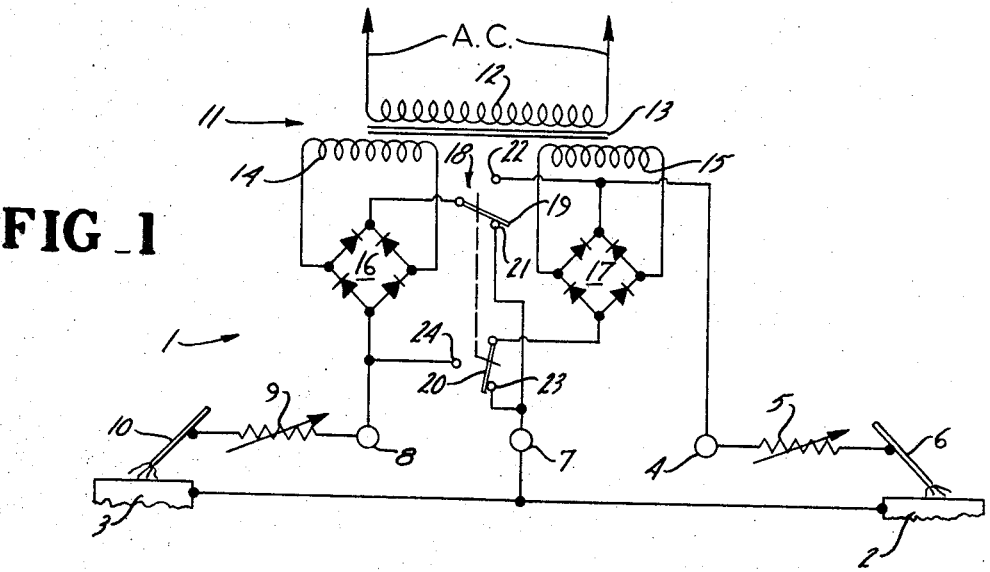

United States Patent

[11] 3,566,072

[72] Inventor Dennis G. Pierce
 Hales Corners, Wis.
[21] Appl. No. 786,184
[22] Filed Dec. 23, 1968
[45] Patented Feb. 23, 1971
[73] Assignee Chemetron Corporation
 Chicago, Ill.

[54] ARC WELDING SUPPLY
 6 Claims, 2 Drawing Figs.

[52] U.S. Cl. .................................................. 219/135,
 219/131
[51] Int. Cl. .................................................. B23k 9/10
[50] Field of Search .......................................... 219/135,
 131 (R), 131

[56] References Cited
 UNITED STATES PATENTS
 2,417,907 3/1947 Bowen, Sr. et al. ............ 219/135X
 2,906,861 9/1959 Lesnewich ..................... 219/135
 3,324,379 6/1967 Mulder ......................... 219/131R
 3,475,585 10/1969 Pierce ......................... 219/131

Primary Examiner—J. V. Truhe
Assistant Examiner—George A. Montanye
Attorney—James E. Nilles ABSTRACT: This disclosure includes a dual polarity, multiple operator direct-current welding source including a single phase or a three-phase constant potential transformer having a primary winding and a pair of secondary windings. A separate full wave diode bridge rectifier is connected to each of the secondary windings. A double pole, double throw switch unit connects the rectifiers to three weld terminals for single polarity welding or dual polarity welding. The one pole is interconnected to the positive side of the one rectifier and selectively engages a first contact connected to the positive side of the second rectifier and to the positive weld terminals or a second contact connected to the common weld terminal. The second switch pole is connected to the negative side of the second rectifier and a first contact connected to the negative side of the first rectifier and to the negative weld terminal means or a second contact connected to the common weld terminal.

PATENTED FEB23 1971 3,566,072

INVENTOR:
DENNIS G. PIERCE
BY:
*James E. Nilles*
Attorney

ARC WELDING SUPPLY

This invention relates to a dual polarity, multiple operator welding source and particularly to a direct-current welding power source of supply permitting simultaneous straight and reverse polarity welding by two different operators.

Arc welding is widely employed in connection with the joining of metal surfaces. A suitable voltage is established between an electrode, either consumable or nonconsumable, and the work, to establish an arc therebetween which generates sufficient heat to melt the work and to affect a fusion of the work directly or with the weld electrode metal. In many applications, the particular welding process requires that a direct current, constant potential supply establish and maintain a corresponding direct-current arc. In some cases, it is desired to have the electrode positive with respect to the work. This is conventionally identified as reverse polarity arc welding. In other instances, the electrode is preferably negative with respect to the work. Such welding is identified as straight polarity arc welding. The present invention is particularly directed to a single constant potential welding power supply having output means which permit simultaneous establishment of two distinct arcs of the different polarities.

In accordance with the present invention, the arc welding power supply includes a constant potential transformer having a primary winding means and a pair of secondary winding means. A separate rectifying means is interconnected to each of the secondary winding means. The outputs of the rectifying means are interconnected with the opposite polarity sides connected to a common output terminal. The opposite side of each rectifying means is then connected respectively to a positive weld terminal means and a negative weld terminal means respectively. A selector switch is inserted between the output sides of the rectifying means and the weld terminal means to permit either a series circuit connection between the positive weld terminal means and the negative weld terminal means for single polarity welding or to connect the rectifying means in parallel to the common output terminal means to permit dual polarity welding. The selector switch in accordance with one aspect of the present invention is a double pole, double throw switch unit. The one pole is interconnected to the positive side of the one rectifier and selectively engages either one of a first and a second contact. The first contact is interconnected to the positive side of the second rectifier and to the positive weld terminal means. The second contact is interconnected to the common weld terminal means. The second pole of the switch is interconnected to the negative output side of the second rectifier and selectively engages either one of two contacts. The first contact is connected to the negative side of the first rectifier and to the negative weld terminal means. This provides very simple, reliable and inexpensive means for selectively establishing the output circuit for the single polarity or the dual polarity outputs.

The power supply system may, of course, be single phase or three phase, with the transformer and rectifiers being correspondingly constructed to produce a full wave rectified output.

The drawing furnished herewith illustrates the best mode presently contemplated by the inventor for carrying out the present invention and clearly discloses the above advantages and features as well as others which will be readily understood from the following description of the illustrated embodiments of the invention.

Figure 2:
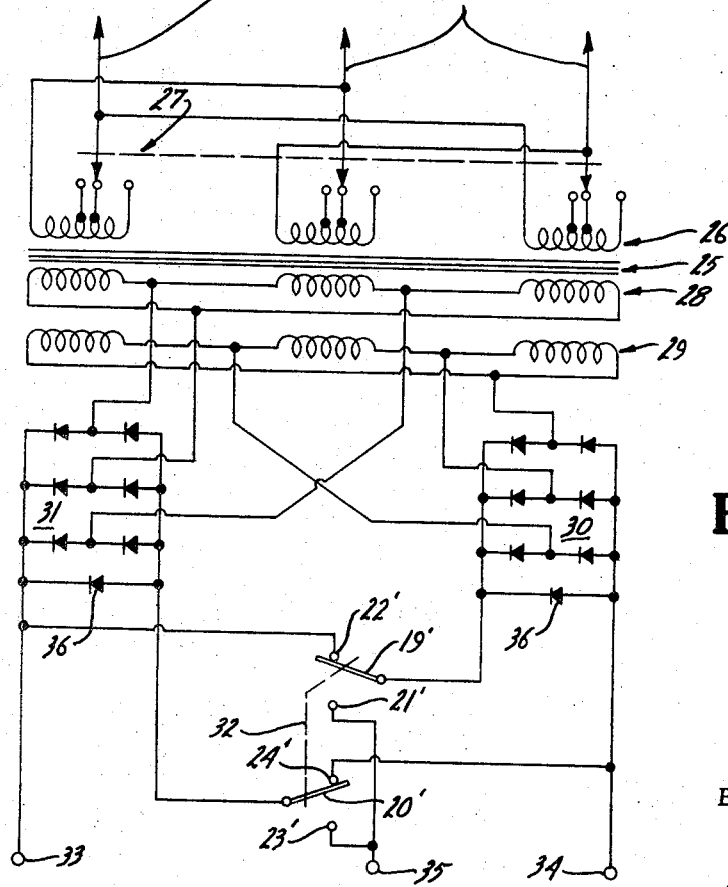

In the drawing:

FIG. 1 is a schematic circuit diagram of a single phase arc welding power supply constructed in accordance with the present invention; and FIG. 2 is a similar schematic circuit diagram of a three phase power supply.

Referring to the drawing and particularly to FIG. 1, a single phase power supply 1 is shown interconnected to energize simultaneously separate arcs for welding two different work members 2 and 3. The power supply includes a positive terminal 4 connected in series through a current control resistor 5 to an electrode 6. The electrode 6 is mounted in any suitable means and in suitably spaced relationship to the work 2 which in turn is interconnected to a common weld terminal 7 of the power supply 1. When the circuit is completed and the electrode 6 properly oriented with respect to the work member 2, the power supply establishes and maintains an arc between the electrode 6 and the work member 2. The electrode 6 as noted is connected to the positive terminal and consequently reverse polarity welding results. The power supply further includes a negative terminal 8 similarly connected in series with a current control resistor 9 to an electrode 10 which is similarly positioned with respect to the opposite work member 3. The common weld terminal 7 is also connected to the work member 3. Consequently, by proper orientation and manipulation of the electrode 10, an arc is established therebetween and straight polarity welding is established.

The present invention is particularly directed to the construction of the power supply 1 and its interconnection to the welding terminals 4, 7 and 8. The illustrated power supply 1 includes a constant potential transformer 11 having a common primary coil or winding 12 wound on a suitable core 13 which is shown diagrammatically in the schematic drawing. A pair of secondary windings 14 and 15 are also wound on the core 13 in close coupled relationship to the primary winding 11 to produce a constant potential output across the secondary windings 14 and 15 respectively. As particular constructions of constant potential arc welding transformers are well known in the art, the desired physical arrangement of the transformer for the present invention will be readily understood by those skilled in the art and consequently no further description thereof is given.

A first full wave diode bridge rectifier 16 has its inputs connected to the secondary winding 14. A similar full wave diode bridge rectifier 17 has its input terminals similarly interconnected to the secondary winding 15. The bridge rectifiers 16 and 17 are well-known diode-type bridges and preferably employ the well-known silicon rectifiers which are presently widely employed in other welding power supplies.

In accordance with an important and novel aspect of the present invention, a selector switch means 18 selectively interconnects the DC output sides of the bridge rectifiers 16 and 17 to the welding terminals 4, 7 and 8 with a series output connection for creating a single polarity voltage between the terminals 4 and 8 or with a parallel connection to establish the illustrated reverse polarity weld voltage between terminals 4 and 7 and the straight polarity weld voltage between the terminals 7 and 8.

The illustrated selector switch 18 is a double pole, double throw switch unit having a pair of contact arms 19 and 20 which are ganged to each other for simultaneous positioning in either one of two circuit-connecting positions. The contact arms are connected respectively to opposite polarity sides or terminals of the rectifiers 16 and 17. Thus, the contact arm 19 is shown connected to the positive side of the bridge rectifier 16 and selectively movable into engagement with either one of a pair of contacts 21 and 22. The contact 21 is connected directly to the common output weld terminal 7. The alternate contact 22 is connected to the positive side of the bridge 17 and directly to the positive weld terminal 4.

Similarly, the contact arm 20 which is connected to the negative side of the rectifier 17 selectively engages either one of two alternate contacts 23 and 24. The contact 23 is connected directly to the common weld terminal 7 and the contact 24 is connected to the negative side of the bridge rectifier 16.

With the switch in the full line position shown in FIG. 1, the contact arms 19 and 20 engage the related common terminals 21 and 23. This establishes the dual polarity output for simultaneously establishing the reverse polarity arc between the electrode 6 and work 2 and the straight polarity arc between the electrode 10 and the work 3.

The arc of electrode 6 is established from the positive side of the rectifier 17, terminal 4, current resistor 5, electrode 6 through the arc to work 2 and back to the negative side of the rectifier 17 via the common weld terminal.

The circuit for the arc to work 3 may be traced from the positive side of the rectifier 16 to the common output terminal 7, the work 3 and through the arc to the electrode 10, the current control resistor 9 to the negative terminal 8 and back to the corresponding negative side of the rectifier 16.

In the alternate position, the contact arms 19 and 20 respectively engage the series connection contacts 22 and 24. In this position, it should be noted that the contacts 21 and 23 are completely disconnected from the circuit and thus the common weld terminal 7 is a dead contact.

The pole 19 and contact 22 interconnect the positive sides of the rectifiers 16 and 17 to each other and to the positive weld terminal 4. The arm 20 and contact 24 similarly interconnect the negative sides of the rectifiers 16 and 17 to each other and to the negative weld terminal 8. Consequently, an electrode and a work member can be connected directly between the terminals 4 and 8 for establishing a welding arc therebetween. The single arc may be straight or reverse polarity connected.

Generally, with a single polarity output, the amperage will be twice the amperage for each of the individual arcs as a result of the constant potential power supply.

Applicant has found that a constant potential power supply constructed in accordance with the present invention permits reliable arc welding with single polarity, single operator or the dual polarity, multiple operator connection and thus provides a very versatile and relatively inexpensive arc welding power supply.

Although illustrated in FIG. 1 in a single phase power system the circuit can be similarly provided in a three phase system, for example, as shown in FIG. 2.

Generally, the circuit of FIG. 2 corresponds to that of FIG. 1 with the components modified to produce a three phase full wave rectifier output. Consequently, the circuit of FIG. 2 is briefly described to relate the components to that of FIG. 1.

Generally, the circuit of FIG. 2 includes a constant potential, three-phase transformer 25 having a three-phase Delta connected primary 26 interconnected to a suitable incoming power supply through a tap switch 27 which permits varying of the input voltage. For example, it is often desired to provide compensation for variations in the input line voltage. In an actual construction, for example, the rated line voltage was 460 volts with a plus and minus 5 percent variation. Thus, the incoming line voltage might in fact be 483 volts or 437 volts. The tap switch 27 allows for compensation of the actual input voltage.

A pair of three-phase Delta connected secondaries 28 and 29 are wound in close coupled relationship to the primary 26 to produce constant potential output voltages in accordance with well-known procedures and constructions. A pair of three phase full wave rectifiers 30 and 31 are connected respectively to the outputs of the secondaries 28 and 29.

A selector switch 32, corresponding to the selector switch 18 of FIG. 1, interconnects the outputs of the rectifiers 30 and 31 to a positive polarity terminal 33, a negative weld terminal 34 and a common weld terminal 35 in the same manner as previously described with respect to FIG. 1.

The selector switch 32 is therefore numbered in accordance with the numbering of switch 18, with the numbers in FIG. 2 being primed for purposes of distinction.

Thus, in FIG. 2, when the selector switch 32 is positioned to interconnect the pole 19' and 20' to the respective contacts 21' and 23', the common weld terminal 35 is connected respectively to the positive side of the rectifier 30 and the negative side of the rectifier 31. The negative side of the rectifier 30 is then connected directly to the negative weld terminal 34 and the positive side of the rectifier 31 is connected to the positive weld terminal 33. This, thus establishes the dual polarity, multiple operator position. In the alternate position of the switch 32, the output of the rectifiers 30 and 31 are connected in series between the positive weld terminal 33 and the negative weld terminal 34 to provide the single polarity output, as in FIG. 1.

In FIG. 2, surge suppressors 36 are connected across the respective rectifiers 30 and 31 in accordance with known procedures.

The present invention thus provides an improved constant potential arc welding power supply which can be employed for the various forms of direct-current welding.

I claim:

1. In an arc welding system for supplying direct current power from an alternating current power source to a welding station having a common weld terminal, a positive weld terminal and a negative weld terminal, the improvement comprising a welding power supply including a transformer having a primary winding connected to the power source and a pair of secondary windings, said transformer being a constant potential transformer having said primary winding close-coupled to said secondary windings, a first full wave rectifier connected to one of said secondary windings and having a positive terminal and a negative terminal, and a second full wave rectifier connected to the other of said secondary windings and having a positive terminal and a negative terminal, said rectifiers establishing a pair of direct current outputs; and a selector switch having a first position for connecting the positive output terminal of said first rectifier and the negative polarity output terminal of said second rectifier to the common weld terminal, the negative terminal of said first rectifier to the negative weld terminal and the positive terminal of said second rectifier to the second weld terminal, whereby a reverse polarity arc can be established at the positive weld terminal and a straight polarity arc can be established at the negative weld terminal simultaneously, said selector switch having a second position connecting said rectifier in parallel between the positive weld terminal and the negative weld terminal and disconnecting the common weld terminal from said rectifiers.

2. In an arc welding system supplying direct current power to a weld station having a common weld terminal, a positive weld terminal and a negative weld terminal, the improvement comprising an arc welding power supply comprising a transformer having a primary winding and a pair of secondary windings, first and second full wave rectifiers each having a positive output terminal and a negative output terminal and each being connected to one of said secondary windings to establish a pair of direct current outputs, and a selector switch having a first position for connecting the negative output terminal of said first rectifier and the positive output terminal of said second rectifier to the common weld terminal and for connecting the positive output terminal of said first rectifier to the positive weld terminal and the negative output terminal of said second rectifier to the negative weld terminal, said switch having a second position connecting said rectifiers in parallel between the positive weld terminal and the negative weld terminal and disconnecting the common weld terminal from said rectifiers.

3. The arc welding power supply of claim 2 wherein said transformer is a constant potential transformer having the primary winding close coupled to said secondary windings.

4. The welding power supply according to claim 2 wherein said switch comprises a double pole-double throw switch having a first contact arm connected to the positive terminal of said first rectifier and a pair of associated contacts one of which is connected to the common weld terminal and the second of which is connected to the positive terminal of said second rectifier; and a second contact arm connected to the negative terminal of said second rectifier and a pair of associated contacts one of which is connected to the common weld terminal and the second of which is connected to the negative terminal of said first rectifier.

5. The arc welding power supply of claim 2 wherein said transformer is a three-phase constant potential transformer, said rectifiers being three-phase full wave diode rectifiers.

6. The arc welding power supply of claim 5 wherein said switch comprises a double pole double throw switch having a first contact arm connected to the positive terminal of said first rectifier and a pair of associated contacts one of which is connected to the common weld terminal and the second of which is connected to the positive terminal of said second rectifier and to the positive weld terminal, said switch having a second contact arm connected to the negative terminal of said second rectifier and a pair of associated contacts one of which is connected to the common weld terminal and the second of which is connected to the negative terminal of said first rectifier and to the negative weld terminal.